(12) United States Patent
Grover et al.

(10) Patent No.: US 12,407,704 B2
(45) Date of Patent: Sep. 2, 2025

(54) BLOCKCHAIN MALWARE PROTECTION (71) Applicant: MICRO FOCUS LLC, Santa Clara, CA (US)

(72) Inventors: Douglas Max Grover, Provo, UT (US); Michael F. Angelo, Houston, TX (US)

(73) Assignee: Micro Focus LLC, Santa Clara, CA (US)

( * ) Notice: Subject to any disclaimer, the term of this patent is extended or adjusted under 35 U.S.C. 154(b) by 0 days.

(21) Appl. No.: 18/485,019

(22) Filed: Oct. 11, 2023

(65) Prior Publication Data

US 2024/0039943 A1 Feb. 1, 2024

Related U.S. Application Data (62) Division of application No. 17/356,164, filed on Jun. 23, 2021, now Pat. No. 12,273,365.

(51) Int. Cl.
*H04L 9/40* (2022.01)
*G06N 20/00* (2019.01)
(Continued)

(52) U.S. Cl.
CPC ......... *H04L 63/1425* (2013.01); *G06N 20/00* (2019.01); *H04L 9/3247* (2013.01);
(Continued)

(58) Field of Classification Search
CPC ............... H04L 63/1425; H04L 9/3247; H04L 63/1416; H04L 63/145; H04L 9/50; H04L 63/0428; H04L 63/101; G06N 20/00
(Continued)

(56) References Cited

U.S. PATENT DOCUMENTS 10,063,572 B2 8/2018 Milazzo et al.
10,382,205 B1 8/2019 Ko et al.
(Continued)

FOREIGN PATENT DOCUMENTS

CN 108965259 B 3/2021
CN 111030978 B * 11/2022 ......... H04L 63/1441

OTHER PUBLICATIONS

Gupta et al. "Developing a Blockchain-Based and Distributed Database-Oriented Multi-Malware Detection Engine," Machine Intelligence and Big Data Analytics for Cybersecurity Applications, Jan. 2021, pp. 249-275.

*Primary Examiner* — Jacob Lipman
(74) *Attorney, Agent, or Firm* — Sheridan Ross P.C.

(57) ABSTRACT

A request to add a new block to a blockchain is received. Data associated with the new block is scanned to identify malware and/or an anomaly. In response to identifying the malware and/or the anomaly in the data associated with the new block, an action is taken. The action includes: rejecting the request to add the new block to the blockchain, or removing the malware/anomaly from the new block and adding the new block to the blockchain. In a second embodiment, a malware event is identified that identifies malware/an anomaly in a block in a blockchain. In response to the malware event, an action is taken. The action includes: consolidating the blockchain, bypassing the block in the blockchain, consolidating the blockchain and bypassing the block in the blockchain, and deleting an encryption key that was used to encrypt the associated data that comprises the malware and/or the anomaly.

20 Claims, 8 Drawing Sheets

(51) Int. Cl.
*H04L 9/32* (2006.01)
*H04L 9/00* (2022.01)

(52) U.S. Cl.
CPC ........ *H04L 63/1416* (2013.01); *H04L 63/145* (2013.01); *H04L 9/50* (2022.05)

(58) Field of Classification Search
USPC .......................................................... 726/22
See application file for complete search history.

(56) References Cited

U.S. PATENT DOCUMENTS

| | | |
|---|---|---|
| 10,542,046 B2 | 1/2020 | Katragadda et al. |
| 10,735,193 B1 | 8/2020 | Knas et al. |
| 10,979,452 B2 | 4/2021 | Kundu et al. |
| 2014/0283078 A1* | 9/2014 | Redfoot .............. H04L 63/0245 726/23 |
| 2018/0204213 A1 | 7/2018 | Zappier et al. |
| 2019/0109713 A1 | 4/2019 | Clark et al. |
| 2019/0297101 A1 | 9/2019 | Dhakshinamoorthy et al. |
| 2019/0356674 A1 | 11/2019 | Irazabal et al. |
| 2020/0007312 A1 | 1/2020 | Vouk et al. |
| 2020/0050686 A1 | 2/2020 | Kamalapuram et al. |
| 2020/0076827 A1* | 3/2020 | Gluck ........................ H04L 9/50 |
| 2020/0334379 A1* | 10/2020 | DeRosa-Grund ..... G06F 21/645 |
| 2020/0371833 A1 | 11/2020 | Baset et al. |
| 2020/0372154 A1 | 11/2020 | Bacher et al. |
| 2020/0374301 A1 | 11/2020 | Manevich et al. |

* cited by examiner

BLOCKCHAIN MALWARE PROTECTION

CROSS REFERENCE TO RELATED APPLICATIONS

This application is a divisional of U.S. patent application Ser. No. 17/356,164, filed Jun. 23, 2021. Cross reference is made to Patent Cooperation Treaty (PCT) Application Serial No. PCT/US2021/033207, filed May 19, 2021, entitled "Blockchain Consolidation with Active Archiving", which is incorporated herein by this reference in its entirety.

FIELD

The disclosure relates generally to blockchains and particularly to protection of blockchains from malware and/or anomalies.

BACKGROUND

One of the key advantages with blockchains is that the data stored/pointed to by the blockchain is immutable. However, this may cause a problem if a blockchain has been compromised by malware. For example, if a block in a blockchain contains malware that is activated when someone accesses the data in the block, this can cause problems anytime someone accesses the block that contains the malware.

In addition, a copy of malware may be stored by the blockchain or pointed to by the blockchain. For example, a malware application that does not actually contain the malware may use a block in the blockchain as a reference to propagate a virus stored in the blockchain to other locations on the network. The problem is, once a block in the blockchain has been inserted or become infected with malware, how can the malware in the blockchain be mitigated without compromising the immutability of the blockchain?

SUMMARY

These and other needs are addressed by the various embodiments and configurations of the present disclosure. The present disclosure can provide a number of advantages depending on the particular configuration. These and other advantages will be apparent from the disclosure contained herein.

A request to add a new block to a blockchain is received. Data associated with the new block is scanned to identify malware and/or an anomaly. In response to identifying the malware and/or the anomaly in the data associated with the new block, an action is taken. The action includes: rejecting the request to add the new block to the blockchain, or removing the malware/anomaly from the new block and adding the new block to the blockchain.

In a second embodiment, a malware event is identified that identifies malware/an anomaly in a block in a blockchain. In response to the malware event, an action is taken. The action includes: consolidating the blockchain, bypassing the block in the blockchain, consolidating the blockchain and bypassing the block in the blockchain, and deleting additional associated controls or data elements (such as encryption key used to encrypt the associated data) which comprise the malware and/or the anomaly.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "blockchain" as described herein and in the claims refers to a growing list of records, called blocks, which are linked using cryptography. The blockchain is commonly a decentralized, distributed and public digital ledger that is used to record transactions across many computers so that the record cannot be altered retroactively without the alteration of all subsequent blocks and the consensus of the network. Each block contains a cryptographic hash of the previous block, a timestamp, and transaction data (generally represented as a merkle tree root hash). For use as a distributed ledger, a blockchain is typically managed by a peer-to-peer network collectively adhering to a protocol for inter-node communication and validating new blocks. Once recorded, the data in any given block cannot be altered retroactively without alteration of all subsequent blocks, which requires consensus of the network majority. In verifying or validating a block in the blockchain, a hashcash algorithm generally requires the following parameters: a service string, a nonce, and a counter. The service string can be encoded in the block header data structure, and include a version field, the hash of the previous block, the root hash of the merkle tree of all transactions (or information or data) in the block, the current time, and the difficulty level. The nonce can be stored in an extraNonce field, which is stored as the left most leaf node in the merkle tree. The counter parameter is often small at 32-bits so each time it wraps the extraNonce field must be incremented (or otherwise changed) to avoid repeating work. When validating or verifying a block, the hashcash algorithm repeatedly hashes the block header while incrementing the counter & extraNonce fields. Incrementing the extraNonce field entails recomputing the merkle tree, as the transaction or other information is the left most leaf node. The body of the block contains the transactions or other information. These are hashed only indirectly through the Merkle root.

As described herein and in the claims, the term "malware" can be any malicious software, such as, a virus, a keylogger, a worm, a trojan, ransomware/crypto-malware, logic bombs, bots/botnets, addware, spyware, rootkits, intentionally malformed data, and/or the like. Malware can infect any portion of a block in a blockchain, such as data in the block, data pointed by the block, and/or the like.

As described herein an in the claims, the term "malware event" may be any event related to the detection of a malicious software, such as the detection of malware, detection of an anomaly, detection of unusual behaviors, detection of unusual traffic patterns, detection of unusual user patterns, detection of different thread activity, detection of different access patterns, and/or the like.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
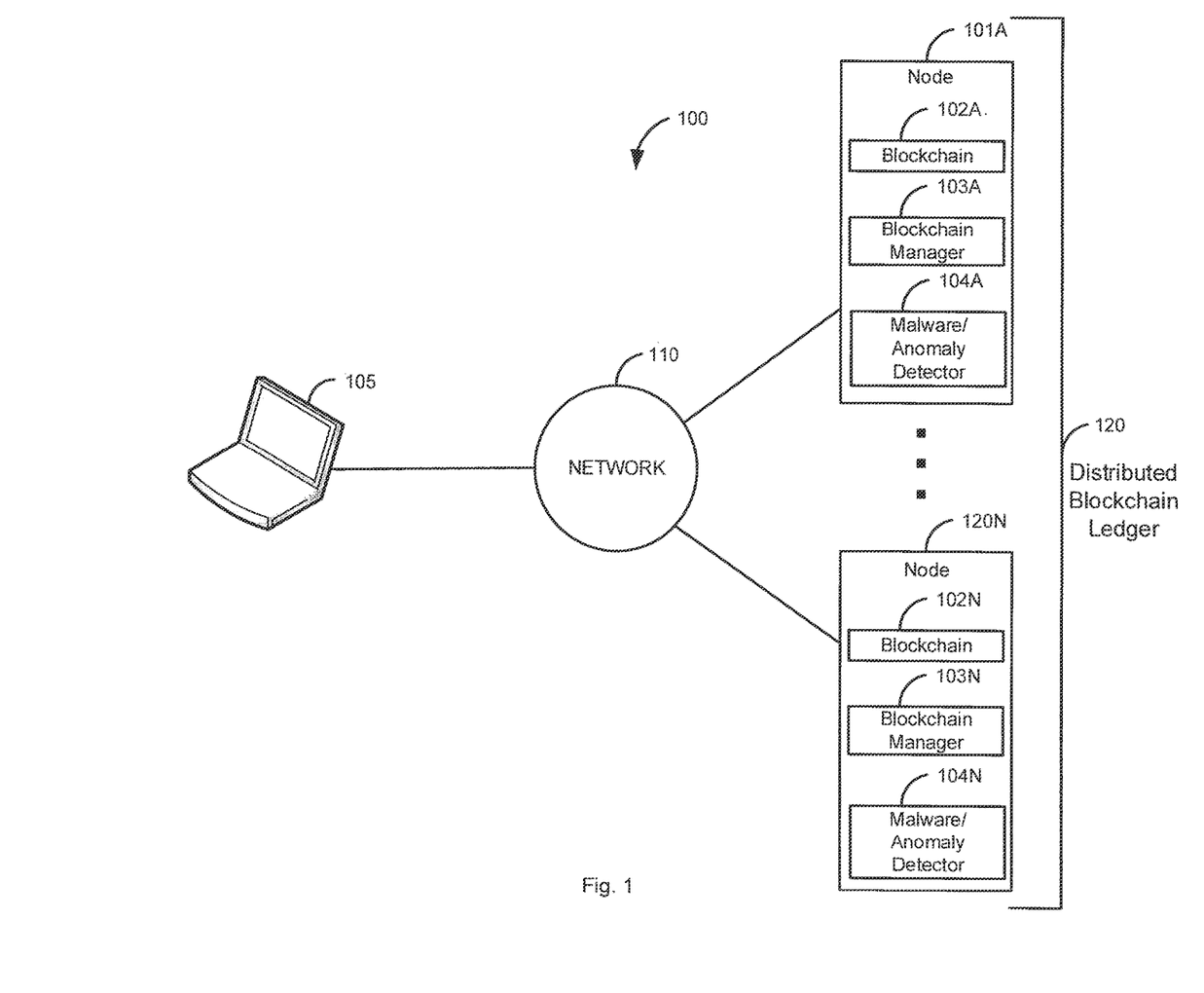
FIG. 1 is a block diagram of a first illustrative system that shows a blockchain in a distributed ledger.

FIG. 1 is a block diagram of a first illustrative system 100 that shows a blockchain 102 in a distributed blockchain ledger 120. The first illustrative system 100 comprises nodes 101A-101N, a communication device 105, and a network 110.

The nodes 101A-101N can be or may include any hardware/software that can support the use of blockchains 102 in the distributed blockchain ledger 120, such as, a Personal Computer (PC), a server, a trust authority server, a gateway, a router, a network device, and/or the like. As shown in FIG. 1, any number of nodes 101A-101N may be connected to the network 110. The nodes 101A-101N further comprise blockchains 102A-102N, blockchain managers 103A-103N, and malware/anomaly detectors 104A-104N.

The blockchains 102A-102N are copies of the same blockchain 102 that comprise the distributed blockchain ledger 120. The size of the blockchains 102A-102N may vary based on implementation. The blockchains 102A-102N are a form of a replicated distributed database.

The blockchain managers 103A-103N can be or may include any hardware coupled with software that can manage the blockchains 102A-102N. The blockchain managers 103A-103N work together to determine how to manage the blockchains 102A-102N. For example, the blockchain managers 103A-103N may vote to validate a new block being added to the blockchains 102A-102N in the distributed blockchain ledger 120.

The malware/anomaly detectors 104A-104N can be or may include any software coupled with software that detect various kinds of malware/anomalies. The malware/anomaly detectors 104A-104N may work in conjunction to identify infected blocks that are either already in the blockchains 102A-102N or new blocks that are being added to the blockchains 102A-102N.

The communication device 105 can be or may include any device that can communicate on the network 110, such as a Personal Computer (PC), a cellular telephone, a Personal Digital Assistant (PDA), a tablet device, a notebook device, a smartphone, and/or the like. The communication device 105 can be used to administer the blockchain managers 103A-103N and/or the malware/anomaly detectors 104A-104N.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 110 can use a variety of electronic protocols, such as Ethernet, Internet Protocol (IP), Hyper Text Markup Language (HTML), Hyper Text Transfer Protocol (HTTP), Web Real-Time Protocol (Web RTC), and/or the like. Thus, the network 110 is an electronic communication network configured to carry messages via packets and/or circuit switched communications.

Figure 2:
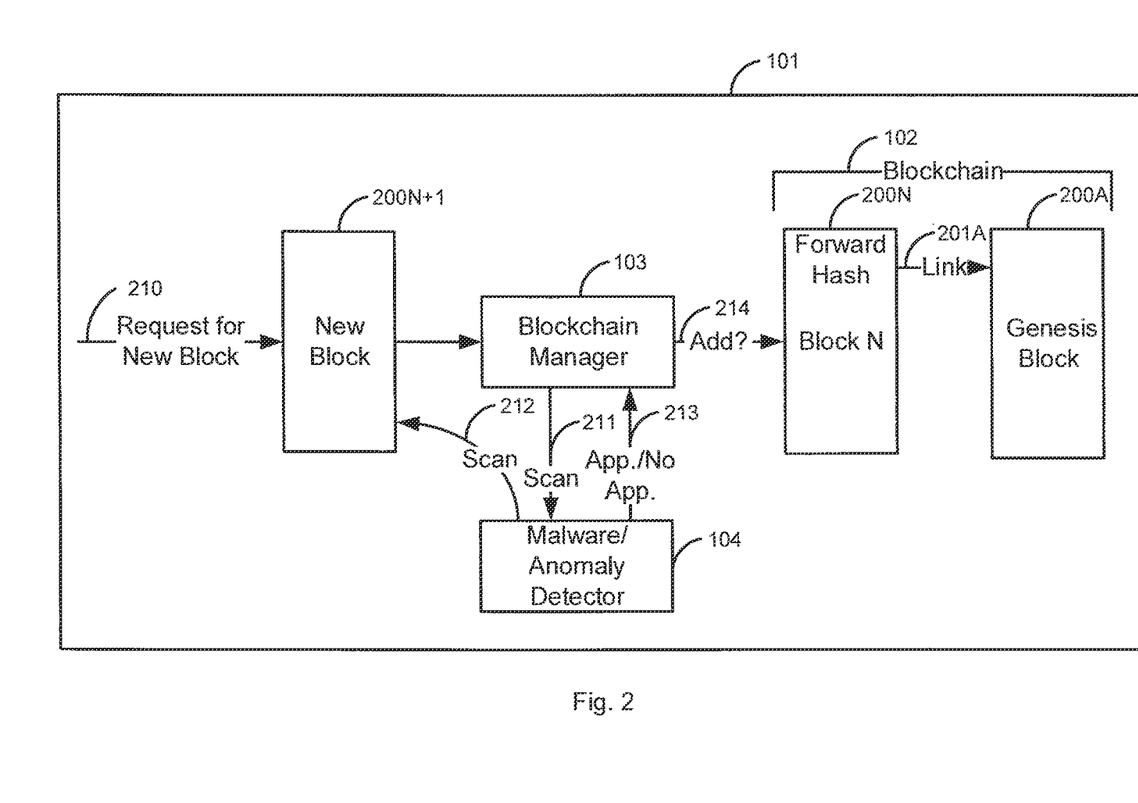
FIG. 2 is a block diagram of a process for identifying malware being added to a blockchain.

FIG. 2 is a block diagram of a process for identifying malware being added to a blockchain 102. FIG. 2 is an example of an exemplary node 101 that comprises the blockchain 102, the blockchain manager 103, and the malware/anomaly detector 104. Each node 101 in the distributed ledger 120 may work in the same manner as described in FIG. 2. In FIG. 2, the blockchain 102 comprises a genesis block 200A and block 200N (where N means that any number of blocks may be in the blockchain 102). The block 200N has a forward hash of the genesis block 200A. The block 200N has a forward link 201A to the genesis block 200A.

When a new block 200N+1 has been requested to be added to the blockchain 102 in step 210, the new block 200N+1 is received by the blockchain manager 103. The blockchain manager 103 requests the malware/anomaly detector 104 to scan the new block 200N+1 in step 211. The new block 200N+1 is scanned by a malware/anomaly detector 104 in step 212. The malware/anomaly detector 104 can scan for known virus/malware patterns, anomalies compared to previous blocks 200A-200N/blockchains 102, and/or the like. The malware patterns could come from a centralized point. The anomaly data could be data that is learned based on machine learning (e.g., unsupervised machine learning). The scanning may include active code that checks for lengths of data so that a buffer overflow condition is not created where malware code can be executed when accessing a block in the blockchain 102 (similar to how emails/PDFs, Word documents have been compromised). This allows for detection of malware that loads based on accessing the data of the blockchain. Once the scan is complete, the malware/anomaly detector 104 notifies the blockchain manager 103 if the new block 200N+1 contains a malware/anomaly in step 213. If the new block 200N+1 does not contain and malware/anomaly, the new block 200N+1 is added to the blockchain 102 in step 214. If the new block 200N+1 does contain a malware/anomaly, the malware/anomaly detector 104 may remove the malware before the new block 200N+1 is added to the blockchain 102 in step 214.

Each node 101 in the distributed blockchain ledger 120 may have a malware/anomaly detector 104A-104N that actively checks for malware being added to any new block 200N+1 in the blockchain 102. By having each node 101 in the distributed blockchain ledger 120 do this, when the new block 200N+1 is requested to be added, the nodes 101A-101N in the distributed blockchain ledger 120 have to have a consensus that the new block 200N+1 does not contain any malware/anomaly before the new block 200N+1 is added to the distributed blockchain ledger 120. Basically anytime a new block 200N+1 is added, the new block 200N+1 is actively checked for malicious code or indicators that may indicate that malicious code/data is being added to the blockchain 102 (either directly in the blockchain 102 or pointed to by the blockchain 102).

Figure 3:
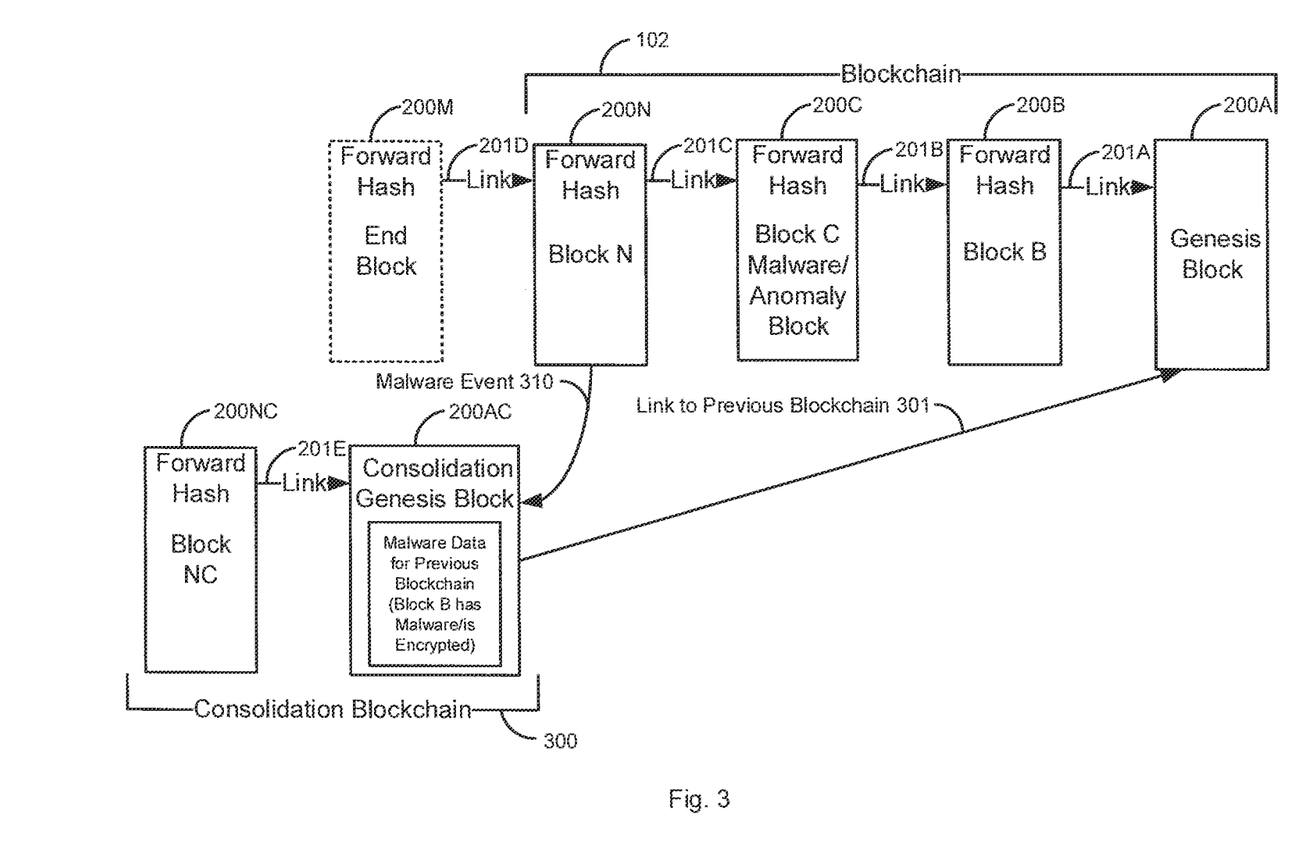
FIG. 3 is a block diagram of a process for consolidating a blockchain based on a malware event.

FIG. 3 is a block diagram of a process for consolidating a blockchain 102 based on a malware event 310. FIG. 3 comprises the blockchain 102 and a consolidation blockchain 300. The blockchain 102 comprises the genesis block 200A, block 200B, malware/anomaly block 200C, and block 200N. The malware/anomaly block 200C contains or links to malware/anomaly data. The blocks 200A-200N are linked together via links 201A-201C as is traditionally done in blockchains 102.

The consolidation blockchain 300 comprises a consolidation genesis block 200AC and block 200NC. The consolidation blockchain 300 is linked via link 201E similar to the blockchain 102.

After creation of the blockchain 102 (including blocks 200A-200N), some type of malware/anomaly is detected in the blockchain 102 (a malware event 310). The detection of the malware/anomaly can be determined in various ways, such as where the malware/anomaly detector 104 receives a new virus pattern and detects that the malware/anomaly block 200C has been infected with the virus or has a pointer that points data that includes the virus. Based on the malware event in step 310, the blockchain manager 103 ends the blockchain 102. Ending the blockchain 102 may comprise adding an end block 200M to the blockchain 102 that identifies that block 200C contains a malware/anomaly. The end block 200M may comprise additional information about the malware/anomaly, such as, the type of malware/anomaly, the location of the malware/anomaly, and/or the like. The end block 200M has a link 201D that links to the block 200N. The end block 200M may also point to the consolidation blockchain 300.

The blockchain manager 103 then creates the consolidation blockchain 300. The creation of the consolidation blockchain 300 comprises creating the consolidation genesis block 200AC. The consolidation genesis block 200AC contains a link 301 back to the blockchain 102. In addition, the consolidation genesis block 200AC contains information that identifies that the malware/anomaly block 200C contains or points to malware. The information may indicate the type of malware and whether the malware is in the malware/anomaly block 200C and/or pointed to by the malware/anomaly block 200C. The information may indicate that block is invalid. If it is later determined that that there is not actually malware in the block 200C (or pointed to by block 200C), a block may be added to the consolidation blockchain that the block 200C is actually valid. The consolidation genesis block 200AC also comprises a hash of the blockchain 102. This is to prevent someone changing or replacing the blockchain 102.

After creation of the consolidation genesis block 200AC, blocks (e.g., block 200NC) are added in the traditional manner to the consolidation blockchain 300. In this illustrative embodiment, block 200NC has been added to the consolidation blockchain 300. The block 200NC has a forward hash and a link 201E to the consolidation genesis block 200AC (similar to the blockchain 102).

By creating the consolidation blockchain 300, the malware/anomaly of malware/anomaly block 200C can effectively be bypassed because of the creation of the consolidation blockchain 300. If data in the blockchain 102 needs to be accessed, an application/user who wants to access the blockchain 102 is made aware that the blockchain 102 contains malware in malware/anomaly block 200C or points to data with malware/anomalies by looking at the information in the consolidation genesis block 200AC.

Figure 4:
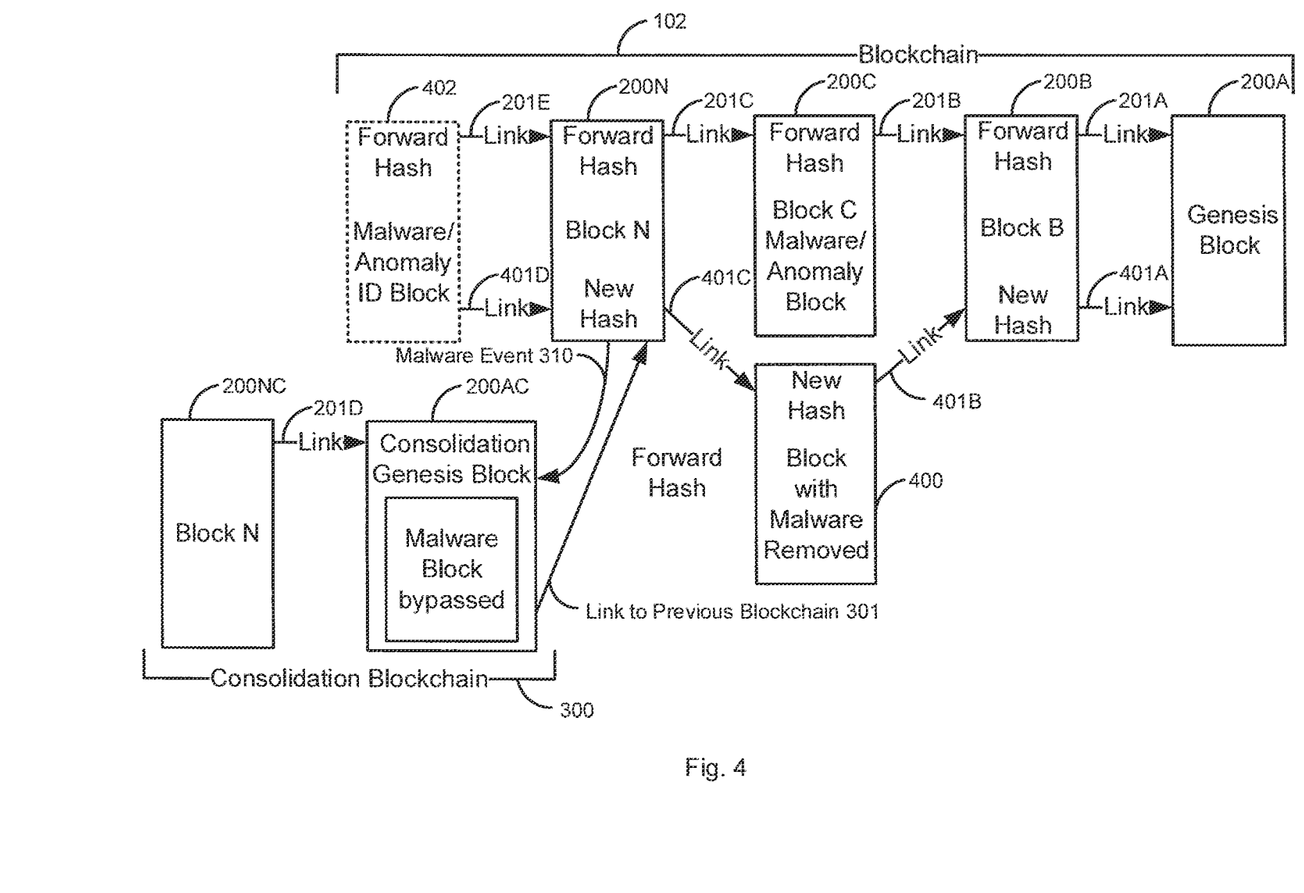
FIG. 4 is a block diagram of a process for consolidating a blockchain based on a malware event by bypassing an infected block.

FIG. 4 is a block diagram of a process for consolidating a blockchain 102 based on a malware event 310 by bypassing the malware/anomaly block 200C. The process of creating the consolidation blockchain 300 based on the malware event 310 works the same as described above in FIG. 3. The difference between FIG. 3 and FIG. 4 is that the data in the consolidation genesis block 200AC also indicates that the malware/anomaly block 200C has been bypassed.

The malware/anomaly block 200C is bypassed by creating bypass block 400 that has the malware removed (or is removed from the data pointed to by the malware/anomaly block 200C). A new forward hash is created that has links 401A-401C that links the blocks 200N, 400, 200B, and 200A together. Thus, when an application/user want to access the blockchain 102, by looking at the consolidation genesis block 200AC, the application/user will know to use the bypass block 400 instead of the malware/anomaly block 200C. The new forward hashes that are linked together via links 401A-401C can be used to validate the bypass block 400.

In another embodiment, instead of creating a consolidation blockchain 300, the malware/anomaly block 200C is just bypassed. When the malware/anomaly is detected, a malware/anomaly ID block 402 is added to the blockchain 102 that identifies the malware/anomaly block 200C and indicates that the malware/anomaly block 200C has been bypassed (like described above). The malware/anomaly ID block 402 has a hash of the bypass block 400 to prevent a substitute for the bypass block 400. The malware/anomaly ID block 402 also has a link 401D that links to the block 200N. The malware/anomaly ID block 402 has a hash of the block 200N. After the malware/anomaly ID block 402 has been added, additional blocks can then be added to the end of the blockchain 102.

Figure 5:
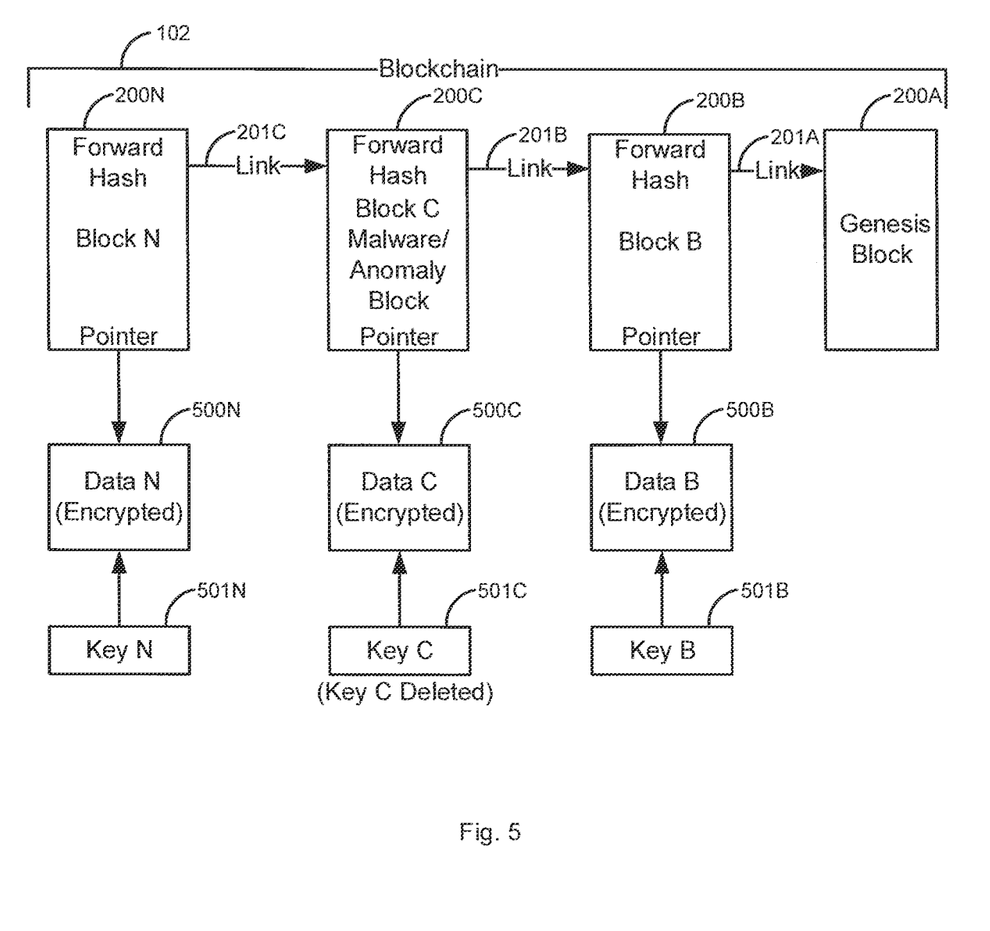
FIG. 5 is a block diagram of a process for removing access to a malware/anomaly block in a blockchain.

FIG. 5 is a block diagram of a process for removing access to a malware/anomaly block 200C in a blockchain 102. FIG. 5 comprises the blockchain 102. The blockchain 102 further comprises the blocks 200A-200N with the links 201A-201C. In FIG. 5, the blocks 200B-200N has pointers to data 500B-500N. Although not shown, the data 500B-500N may actually reside within the blocks 200B-200N.

When a new block is added to the blockchain 102, the data associated with the new block is encrypted with an individual encryption key. For example, as shown in FIG. 5, the data 500B is encrypted with key 501B, the data 500C is encrypted with key 501C, and the data 500N is encrypted with key 501N. When an application/user wants to access the data 500B-500N, the individual encryption keys 501B-501N are used respectively to unencrypt the data 500B-500N.

When anomalies/malware is detected in the malware/anomaly block 200C, the blockchain manager 103 deletes the encryption key 501C. Thus access to the data 500C can no longer occur. This prevents someone from accessing the data 500C, which contains the malware/anomaly.

Figure 6:
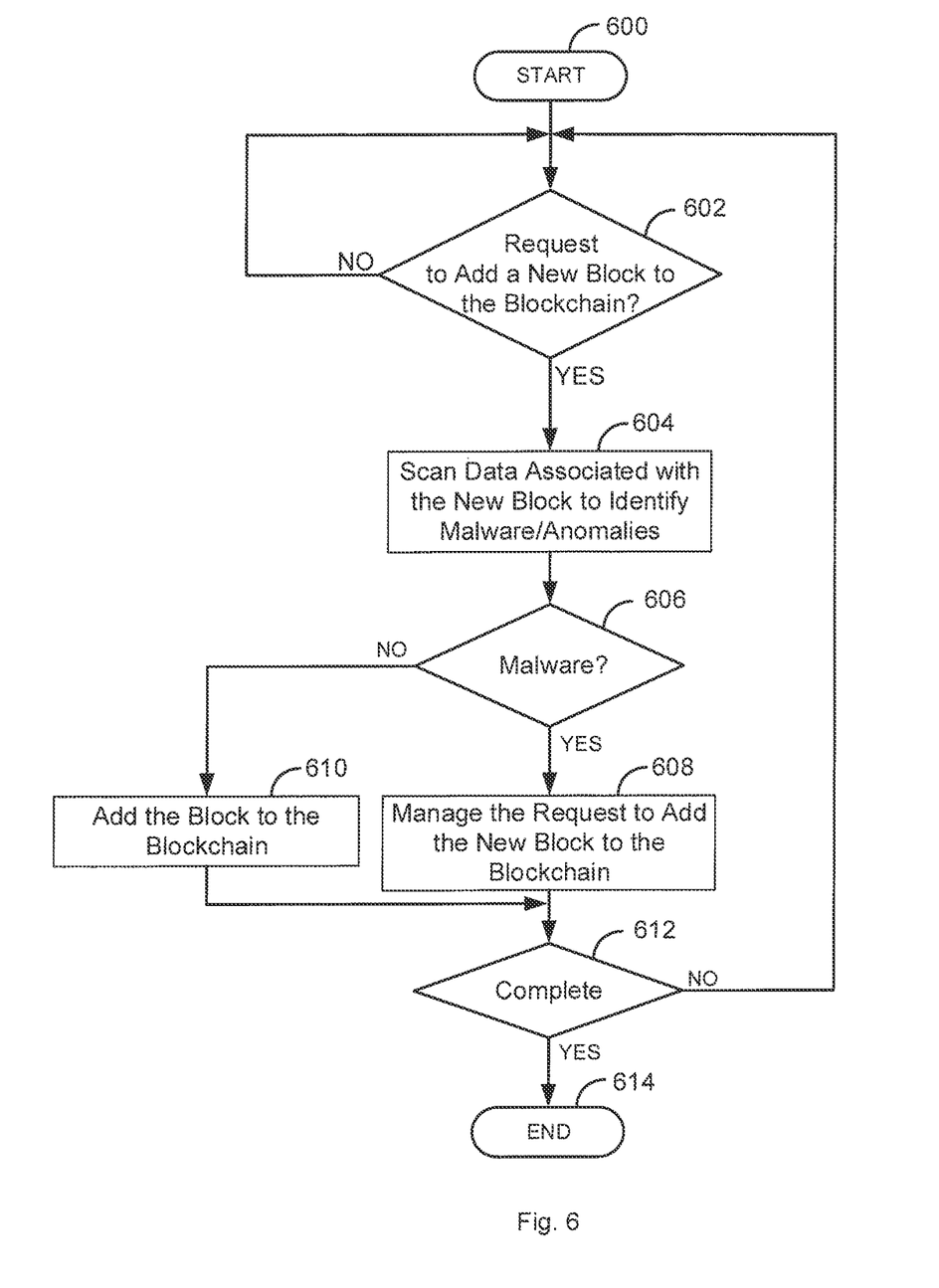
FIG. 6 is a flow diagram of a process for identifying malware/anomalies being added to a blockchain.
Figure 7:
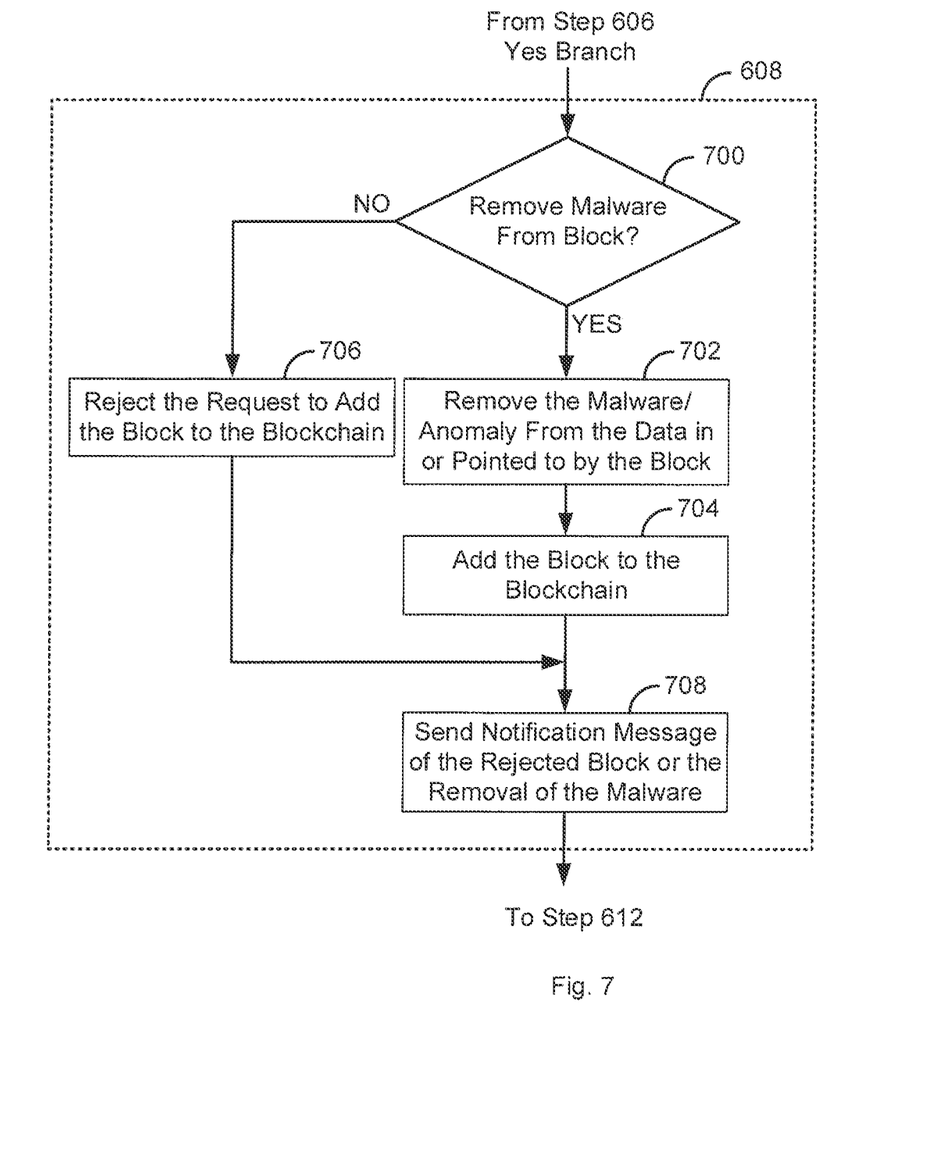
FIG. 7 is a flow diagram of a process for managing malware in a new block that has been requested to be added to a blockchain.
Figure 8:
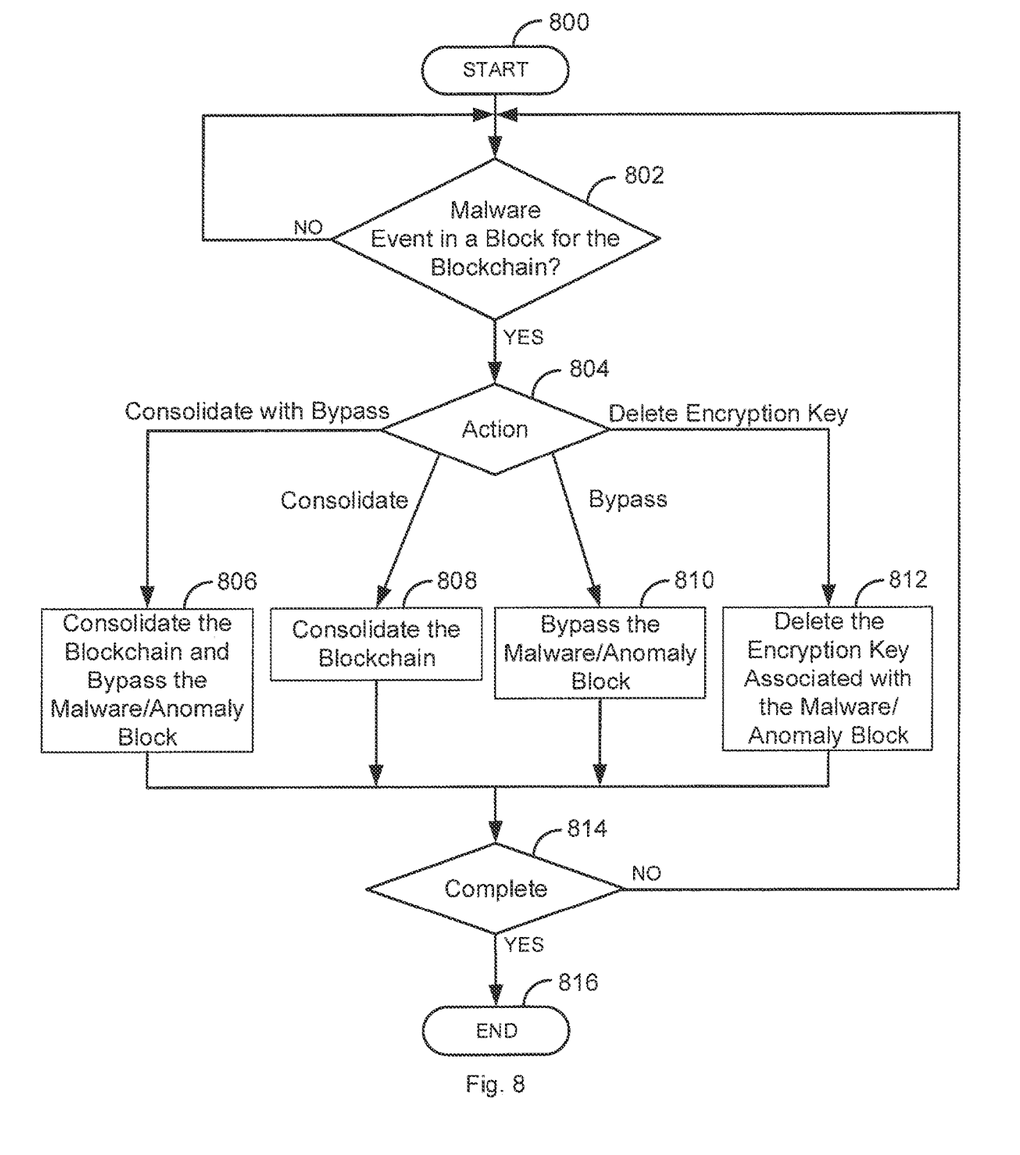
FIG. 8 is a flow diagram of a process for mitigating malware that has been stored in a blockchain.

FIG. 6 is a flow diagram of a process for identifying malware/anomalies being added to a blockchain 102. Illustratively, the nodes 101A-101N, the blockchains 102A-102N, the blockchain managers 103A-103N, the malware/anomaly detectors 104A-104N, and the communication device 105 are stored-program-controlled entities, such as a computer or microprocessor, which performs the method of FIGS. 6-8 and the processes described herein by executing program instructions stored in a computer readable storage medium, such as a memory (i.e., a computer memory, a hard disk, and/or the like). Although the methods described in FIGS. 6-8 are shown in a specific order, one of skill in the art would recognize that the steps in FIGS. 6-8 may be implemented in different orders and/or be implemented in a multi-threaded environment. Moreover, various steps may be omitted or added based on implementation.

The process starts in step 600. The blockchain manager 103 waits, in step 602, for a request to add the new block 200N+1 to the blockchain 102. If a request to add the new block 200N+1 to the blockchain 102 is not received in step 602, the process of step 602 repeats. Otherwise, if a request to add the new block 200N+1 to the blockchain 102 is received in step 602, the malware/anomaly detector 104 scans the data 500 associated with the new block 200N+1 to identify any malware/anomalies in step 604.

If there are no malware/anomalies detected in the new block 200N+1 in step 606, the blockchain manager 103 adds, in step 610, the new block 200N+1 to the blockchain 102. The adding of the new block 200N+1 in step 610 is based on a consensus vote of the blockchain managers 103A-103N in the distributed blockchain ledger 120. The process then goes to step 612. If there is malware detected in step 606, the malware/anomaly detector 104 manages the request to add the new block 200N+1 in step 608. For example, the malware/anomaly may be removed from the blockchain 102. Step 608 is described in further detail in FIG. 7. The process then goes to step 612.

The blockchain manager 103 determines, in step 612, if the process is complete. If the process is not complete in step 612, the process goes back to step 602. Otherwise, if the process is complete in step 612, the process ends in step 614.

FIG. 7 is a flow diagram of a process for managing malware/anomalies in a new block 200N+1 that has been requested to be added to the blockchain 102. The process of FIG. 7 is an exemplary embodiment of step 608 of FIG. 6. If malware is detected in the data in step 606, the malware/anomaly detector 104 determines whether to remove the malware/anomaly from the block in step 700. Step 700 may work in various ways. For example, the decision of step 700 may be administered, may be based on the type of malware/anomaly, based on a security level and/or type of the blockchain 102, based on a user/application requesting to add the new block 200N+1 to the blockchain 102, based on machine learning, and/or the like.

If the malware/anomaly is not to be removed from the blockchain 102 in step 700, the blockchain manager 103 rejects the request to add the new block 200N+1 to the blockchain 102 in step 706. The process then goes to step 708.

Otherwise, if the decision is to remove the malware/anomaly in step 700, the malware/anomaly detector 104 removes the malware/anomaly from the data in the new bock 200N+1 or the data pointed to by the new block 200N+1 in step 702. The blockchain manager 103 adds the new block 200N+1 to the blockchain 102 in step 704. The blockchain manager 103 then sends a notification message of the rejected new block 200N+1 or the removal of the malware/anomaly in step 708. For example, an administrator of the blockchain 102 at the communication device 105 may be notified in step 708. The process then goes to step 612.

The process of steps 702, 704, and 706 are completed by the blockchain managers 103A-103N based on a consensus vote of the blockchain managers 103A-103N. A consensus vote is based on more than 50% agreement of the blockchain managers 103A-103N to take the actions of steps 702, 704, and 706.

FIG. 8 is a flow diagram of a process for mitigating malware that has been stored in a blockchain 102. The process starts in step 800. The malware/anomaly detector 104, in step 802, determines if a malware event has been identified in the blockchain 102. A malware event may be based on various types of events, such as, detection of a virus in the blockchain 102, detection of anomalous data in the blockchain 102, detection of an malicious actor that added a block to the blockchain 102, detection of a malicious application/user accessing a block(s) in the blockchain 102, periodic access of the blockchain 102 where this previously never occurred (e.g., a malicious application is loading a virus out of the blockchain 102), detection of a virus pattern in the blockchain 102, detection of a malformed block in the blockchain 102, detection of malicious behavior based on data 500 in the blockchain 102, and/or the like. The detection of a malformed block may include detection of where the block (e.g., block 200C) is intentionally malformed. In this case, the attack would be to either try and crash the block chain 121 processing or generate a buffer overflow. In the case of the buffer overflow, the attack would cause the validation process to do something bad or the compromise the process.

If a malware event is not identified in step 802, the process of step 802 repeats. Otherwise, if the malware event is identified in step 802, the malware/anomaly detector 104 determines the type of action to take. In FIG. 8, the malware/anomaly detector 104 may take different actions. The first option is to consolidate the blockchain 102 with using the bypass in step 806 as described above in FIG. 4. Here the blockchain manager 103 creates the consolidation genesis block 200AC (that indicates that there is malware/an anomaly in the malware/anomaly block 200C), the bypass block 400, and the new hashes/links 401A-401C like shown and described in FIG. 4. The process then goes to step 814.

Alternatively, the action may be to just consolidate the blockchain 102 in step 808 as described in above in FIG. 3. In step 808, the consolidation genesis block 200AC (the start of the consolidation blockchain 300) is created and optionally the end block 200M. The consolidation genesis block 200AC indicates that the malware/anomaly block 200C contains malware and/or one or more anomalies. The information in the consolidation genesis block 200AC may include the type of malware, information on how the malware works, whether the malware is located in the malware/anomaly block 200C or is pointed to by the malware/anomaly block 200C, if there is an anomaly in the malware/anomaly block 200C, if there is an anomaly pointed to by the malware/anomaly block 200C, the type of anomaly, who recommended adding the malware block 200AC, any other type of information related to the malware/anomaly, and/or the like. The process then goes to step 814.

Another option is to bypass the malware/anomaly block 200C in step 810. Like described in FIG. 4, the malware/anomaly ID block 402 is added to the blockchain 102 that identifies the malware/anomaly block 200C and indicates that the malware/anomaly block 200C has been bypassed. The bypass block 400 is added along with the links 401A-401C that link the bypass block 400 to the blockchain 102.

In step 810, the process may bypass the malware/anomaly block 200C by deleting a pointer to the data (e.g., the pointer in block 200C that points to the data 500C) that contains the malware. The process then goes to step 814.

Alternatively, the action may be to delete the individual encryption key (e.g., encryption key 501C) that is associated with the malware/anomaly block 200C in step 812 as described above in FIG. 5. This way, the malware/anomaly data is encrypted and cannot be accessed. Thus, the malware/anomaly is now benign. The process then goes to step 814.

In some embodiments, the malware/anomaly detector 104 may only have two or even one option in step 804. The type of action that is taken in step 804 may be administered based on the type of malware event and/or anomaly. The action taken in step 804 may be based on the configuration of the blockchain 102. For example, if the blockchain 102 was created using the encryption key method of FIG. 5, then the process would delete the encryption key in step 812.

The blockchain manager 103 determines, in step 814 if the process is complete. If the process is not complete in step 814, the process goes back to step 802. Otherwise, if the process is complete in step 814, the process ends in step 816.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM1926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof.

Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system, comprising:
   a microprocessor; and
   a computer readable medium, coupled with the microprocessor and comprising microprocessor readable and executable instructions that, when executed by the microprocessor, cause the microprocessor to:
   identify a malware event, wherein the malware event identifies a block in a blockchain that has associated data that comprises malware and/or an anomaly; and
   in response to identifying the malware event that identifies the block in the blockchain that has the associated data that comprises the malware and/or the anomaly, doing at least one of the following actions:
   consolidate the blockchain;
   consolidate the blockchain and bypass the block in the blockchain that comprises the malware and/or anomaly; and
   delete an encryption key that was used to encrypt the associated data that comprises the malware and/or the anomaly.

2. The system of claim 1, wherein the malware event is based on at least one of the following:
   detection of a virus in the blockchain;
   detection of anomalous data in the blockchain;
   detection of a malicious application/user accessing one or more blocks in the blockchain;
   detection of abnormal periodic access of the blockchain;
   detection of a virus pattern in the blockchain;
   detection of an intentionally malformed block in the blockchain; and
   detection of malicious behavior based on data in the blockchain.

3. The system of claim 1, wherein doing at least one of the following actions includes consolidate the blockchain and bypass the block in the blockchain that comprises the malware and/or anomaly.

4. The system of claim 1, wherein doing at least one of the following actions includes delete the encryption key that was used to encrypt the associated data that comprises the malware and/or the anomaly.

5. The system of claim 1, wherein the microprocessor is further caused to:
   determine that the malware and/or anomaly is not actually the malware and/or anomaly; and
   add a block to the blockchain and/or to a consolidation blockchain that indicates that the malware and/or anomaly is not actually the malware and/or anomaly.

6. The system of claim 1, wherein doing at least one of the following actions is based on a type of malware event.

7. The system of claim 1, wherein doing at least one of the following actions is based on a configuration of the blockchain.

8. The system of claim 1, wherein doing at least one of the following actions includes consolidate the blockchain by creating a consolidation genesis block of a consolidation blockchain, wherein the consolidation genesis block identifies the block in the blockchain that has the associated data that comprises the malware and/or the anomaly, and wherein the consolidation genesis block of the consolidation blockchain points to the blockchain and comprises a hash of the blockchain.

9. The system of claim 8, wherein an end of block is added to the blockchain that points to the consolidation blockchain.

10. The system of claim 9, wherein the end of block identifies the block in the blockchain that has the associated data that comprises the malware and/or the anomaly.

11. A method, comprising:
    identifying, by a microprocessor, a malware event, wherein the malware event identifies a block in a blockchain that has associated data that comprises malware and/or an anomaly; and
    in response to identifying the malware event that identifies that the block in the blockchain that has the associated data that comprises the malware and/or the anomaly, doing at least one of the following actions:
    consolidating, by the microprocessor, the blockchain;
    consolidating, by the microprocessor, the blockchain and bypassing the block in the blockchain that comprises the malware and/or anomaly; and
    deleting, by the microprocessor, an encryption key that was used to encrypt the associated data that comprises the malware and/or the anomaly.

12. The method of claim 11, wherein the malware event is based on at least one of the following:
    detection of a virus in the blockchain;
    detection of anomalous data in the blockchain;
    detection of a malicious application/user accessing one or more blocks in the blockchain;
    detection of abnormal periodic access of the blockchain;
    detection of a virus pattern in the blockchain;
    detection of an intentionally malformed block in the blockchain; and
    detection of malicious behavior based on data in the blockchain.

13. The method of claim 11, wherein doing at least one of the following actions includes consolidate the blockchain and bypass the block in the blockchain that comprises the malware and/or anomaly.

14. The method of claim 11, wherein doing at least one of the following actions includes delete the encryption key that was used to encrypt the associated data that comprises the malware and/or the anomaly.

15. The method of claim 11, further comprising:
    determining, by the microprocessor, that the malware and/or anomaly is not actually the malware and/or anomaly; and
    adding, by the microprocessor, a block to the blockchain and/or to a consolidation blockchain that indicates that the malware and/or anomaly is not actually the malware and/or anomaly.

16. The method of claim 11, wherein doing at least one of the following actions is based on a type of malware event.

17. The method of claim 11, wherein doing at least one of the following actions is based on a configuration of the blockchain.

18. The method of claim 11, wherein doing at least one of the following actions includes consolidate the blockchain by creating a consolidation genesis block of a consolidation blockchain, wherein the consolidation genesis blocks identifies the block in the blockchain that has the associated data that comprises the malware and/or the anomaly, and wherein the consolidation genesis block of the consolidation blockchain points to the blockchain and comprises a hash of the blockchain.

19. The method of claim 18, wherein an end of block is added to the blockchain that points to the consolidation blockchain.

20. The method of claim 19, wherein the end of block identifies the block in the blockchain that has the associated data that comprises the malware and/or the anomaly.

* * * * *